United States Patent [19]

Yanusko

[11] Patent Number: 5,794,488
[45] Date of Patent: Aug. 18, 1998

[54] CORE ELEMENT CONNECTOR FOR REMOTE CONTROL ASSEMBLY

[75] Inventor: David P. Yanusko, Pottstown, Pa.

[73] Assignee: Triumph Controls, Inc, North Wales, Pa.

[21] Appl. No.: 818,773

[22] Filed: Mar. 14, 1997

[51] Int. Cl.⁶ ............................................. F16C 1/10
[52] U.S. Cl. .................. 74/502.6; 74/505; 74/89.2; 74/500.5; 474/253; 403/58
[58] Field of Search .................. 74/89.2, 89.21, 74/89.22, 500.5, 502.4, 502.6, 504, 505, 506; 403/57, 58; 474/204, 253, 255, 257

[56] References Cited

U.S. PATENT DOCUMENTS

| | | | |
|---|---|---|---|
| 278,346 | 5/1883 | Long . | |
| 2,297,813 | 10/1942 | Stork | 474/210 X |
| 2,446,542 | 8/1948 | MacInnes . | |
| 2,499,030 | 2/1950 | Moon | 403/58 X |
| 2,586,268 | 2/1952 | Smith | 474/211 |
| 2,893,540 | 7/1959 | Freeman | 474/310 X |
| 2,957,353 | 10/1960 | Babacz . | |
| 3,045,609 | 7/1962 | Brown . | |
| 3,237,977 | 3/1966 | Batchelder | 287/119 |
| 3,468,569 | 9/1969 | Ballard et al. . | |
| 3,625,084 | 12/1971 | Low . | |
| 3,825,356 | 7/1974 | Crook . | |
| 4,290,762 | 9/1981 | Lapeyre | 474/210 |
| 4,509,387 | 4/1985 | Tschanz et al. . | |
| 4,887,929 | 12/1989 | Hale . | |
| 5,381,706 | 1/1995 | Yanusko et al. . | |
| 5,426,995 | 6/1995 | Maennle . | |
| 5,518,097 | 5/1996 | Dabin . | |

*Primary Examiner*—Vinh T. Luong
*Attorney, Agent, or Firm*—Howard & Howard

[57] ABSTRACT

A motion transmitting remote control assembly (10) comprising a drive wheel (20) having a plurality of gear teeth (18) and rotatably supported by a drive wheel housing (12) and a driven wheel (16) having a plurality of gear teeth (18) and rotatably supported by a driven wheel housing (14) which is spaced from the drive wheel housing (12). A motion transmitting core element (30), comprising a flexible cable (31) having first and second ends (32 and 34) and a wire (36) wrapped helically about the cable (31) in spaced convolutions, is entrained about the wheels (16 and 20) and is in meshing engagement with the gear teeth (18) for transmitting rotational movement between the wheels (16 and 20). A connector interconnects the first and second ends (32 and 34) of the core element (30) for maintaining the core element (30) entrained about the wheels (16 and 20) regardless of the orientation of the core element (30) as the core element (30) passes through the housings (12 and 14). The connector is characterized by a first loop (64) attached to the first end (32) of the core element (30) and a second loop (34) attached to the second end (34) of the core element (30) and a single unitary link (68) extending through the loops (64 and 66), i.e., the loops (64 and 66) extend through holes (80) in the ends of the plate-like link (68).

10 Claims, 2 Drawing Sheets

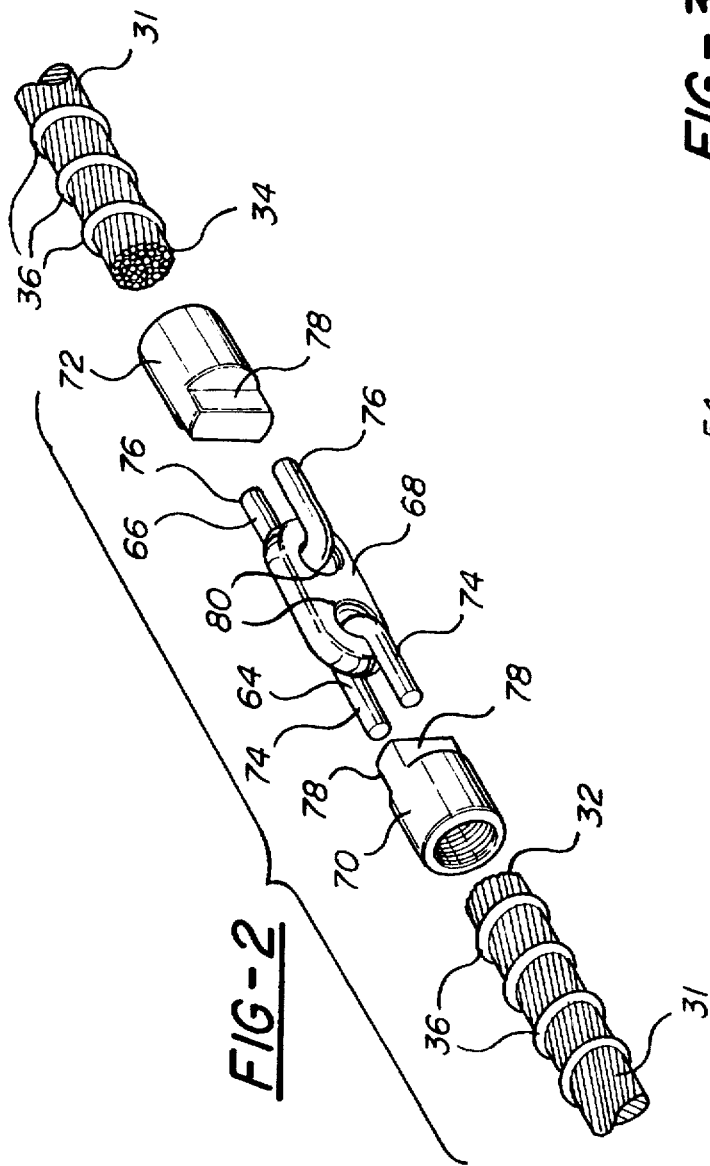
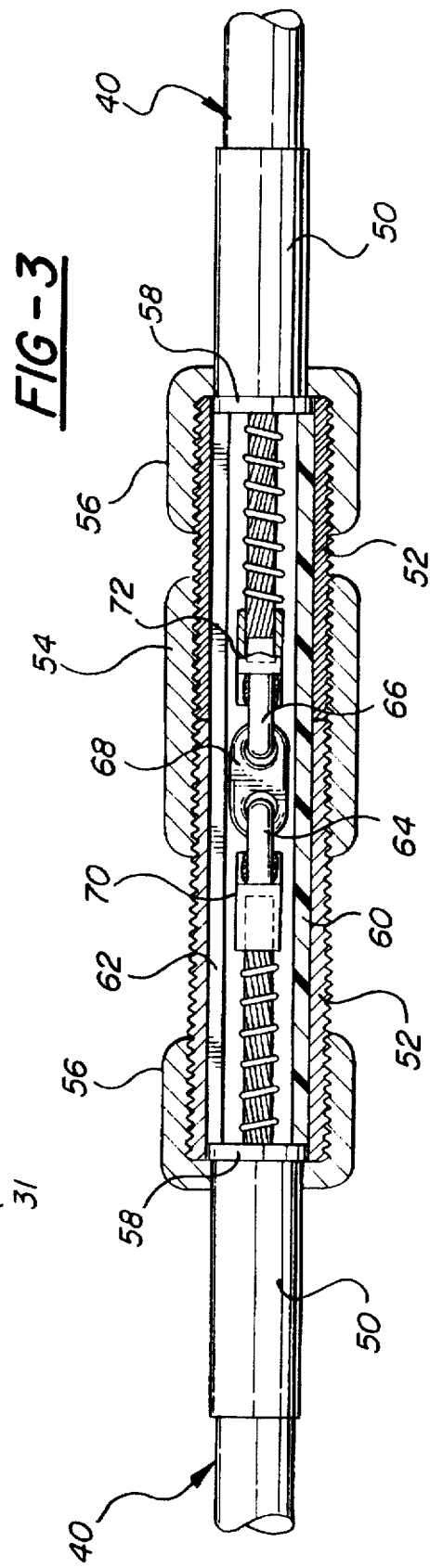

CORE ELEMENT CONNECTOR FOR REMOTE CONTROL ASSEMBLY

TECHNICAL FIELD

The subject invention relates to a motion transmitting remote control assembly of the type for transmitting motion in a curved path by a flexible core element and more particularly to a connector for splicing the ends of an endless core element entrained about spaced wheels for transmitting rotational movement between the wheels.

BACKGROUND OF THE INVENTION

Such remote control assemblies are often used to open and close a valve from a control station positioned remotely from the valve. Such remote control assemblies are shown in U.S. Pat. Nos. 4,509,387 to Tschanz et al and 5,381,706 to Yanusko et al. These assemblies include a core element comprising a multi-stranded cable with a wire spirally wrapped around the cable in spaced convolutions to define spaced teeth which engage grooves in spaced gear wheels to enable rotational movement to be transmitted between the wheels. The core element is made endless by joining the two ends of a length of core element with a connector which travels back and forth between the wheels and around the wheels as the core element rotates about its own axis, i.e., twists during movement. The connector must navigate the radius of the wheels while maintaining the core element in contact with the gear teeth of the wheels. It must also pass through the housing s supporting the wheels without binding or jamming.

Various connectors are known to the prior art as exemplified by U.S. Pat. Nos. 2,957,353 to Babacz and 3,468,569 to Ballard et al.

SUMMARY OF THE INVENTION AND ADVANTAGES

A motion transmitting remote control assembly comprising a drive wheel having a plurality of gear teeth and rotatably supported by a drive wheel housing and a driven wheel having a plurality of gear teeth and rotatably supported by a driven wheel housing which is spaced from the drive wheel housing. A motion transmitting core element, comprising a flexible cable having first and second ends and a wire wrapped helically about the cable in spaced convolutions, is entrained about the wheels and is in meshing engagement with the gear teeth for transmitting rotational movement between the wheels. A connector means interconnecting the first and second ends of the core element for maintaining the core element entrained about the wheels regardless of the orientation of the core element as the core element passes through the housings. The connector means is characterized by a first loop attached to the first end of the core element and a second loop attached to the second end of the core element and a single unitary link extending through the loops.

Accordingly, the subject invention provides a connector for such a remote control assembly which more nearly approaches the flexibility of the core element, retains the core element in close engagement with the wheels without undue stress, yet remains inexpensive and easily fabricated.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is an exploded perspective view of the connector of the subject invention; and FIG. 3 is an enlarged cross sectional view taken along line 3—3 of FIG. 1 and showing a connector in a remote control assembly.

DETAILED DESCRIPTION OF THE PREFERRED EMBODIMENT

Figure 1:
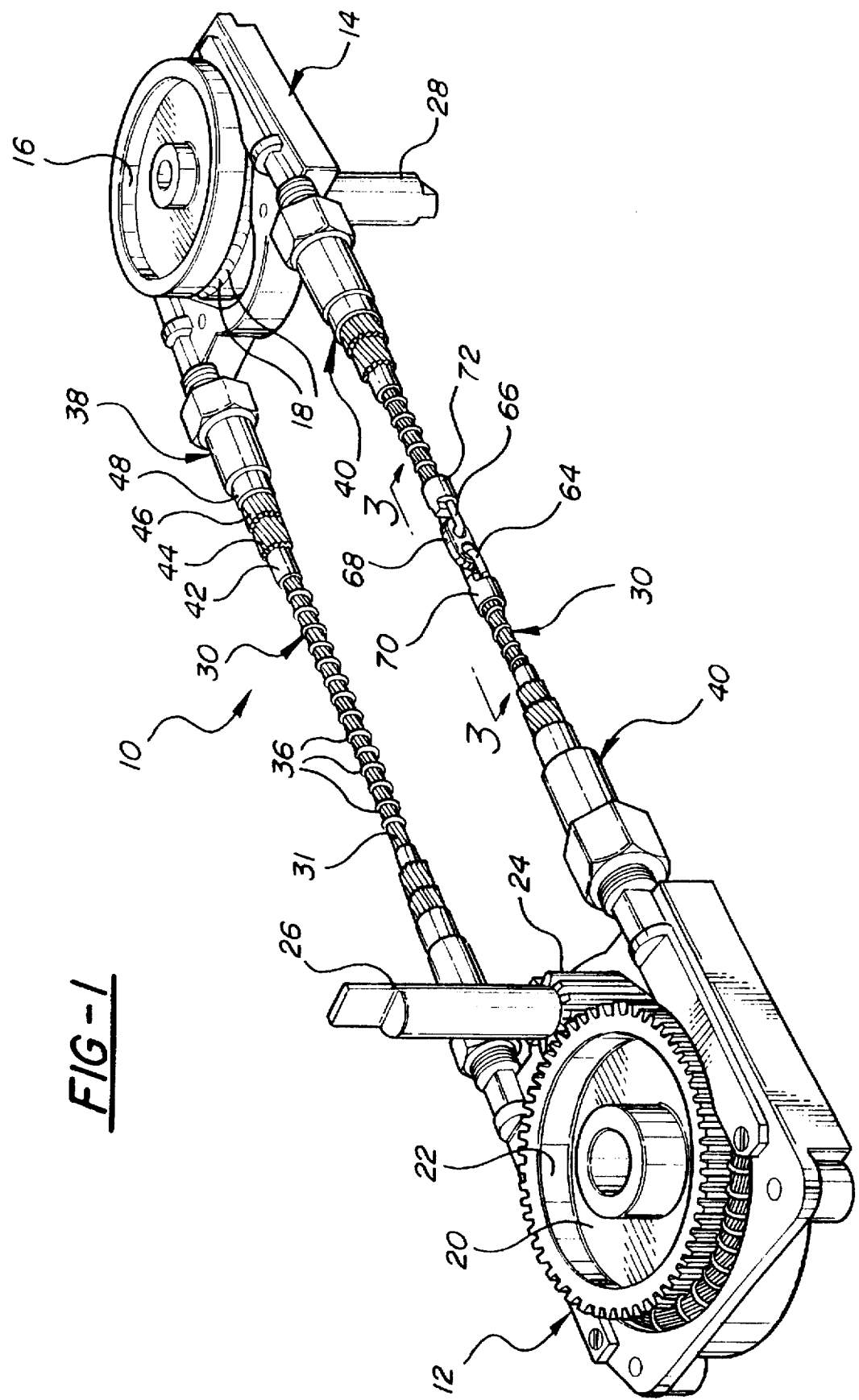
FIG. 1 is a perspective view of the remote control assembly of which the subject invention is a part.

Referring to the Figures, wherein like numerals indicate like or corresponding parts throughout the several views, a motion transmitting remote control assembly is generally shown at 10 in FIG. 1 and comprises a drive wheel housing, generally indicated at 12, and a driven wheel housing, generally indicated at 14, spaced from the drive wheel housing 12. A driven wheel 16 is rotatably supported by the driven wheel housing 14 and has a plurality of gear teeth 18, the gear teeth 18 actually being formed by spaced grooves in a semi-circular recess extending annularly about the periphery of the driven wheel 16. A drive wheel 20 is rotatably supported by the drive wheel housing 12 and also has a plurality of gear teeth formed by spaced grooves in a semi-circular recess extending annularly about the periphery of the drive wheel 20. The drive wheel 20 is formed integrally with a gear 22 which is, in turn, rotated by a pinion gear 24. The pinion gear 24 is rotated by a shaft 26, which is normally attached to a wheel of crank for manual rotation. On the output end, the driven wheel 16 is attached to a drive shaft 28 which is connected to a valve, or the like.

The assembly 10 also includes a motion transmitting core element, generally indicated at 30, comprising a flexible cable 31 having first 32 and second 34 ends and a wire 36 wrapped helically about the cable 31 in spaced convolutions and entrained about the wheels 16 and 20 and in meshing engagement with the gear teeth 18 for transmitting rotational movement between the wheels 16 and 20. In other words, the wire 36 is disposed in and engages the grooves 18 in the wheels 16 and 20. The cable 31 comprises a plurality of long lay wires wrapped in a helical fashion and bound together by the wire 36. The wire 36 forms radial protrusions about the length of the cable 31 for meshing engagement with the gear teeth 18 to entrain the core element 30 around the driven and drive wheels 16 and 20 whereby the core element 30 transmits rotational movement between the wheels 16 and 20.

A pair of parallel and spaced conduits, generally indicated at 38 and 40 respectively, extend between the housings 12 and 14 for slidably supporting the core element 30. Each of the conduits 38 and 40 includes four layer wherein the inner most layer 42 comprises a polytetraflouroethylene liner; the second layer 44 comprises high tensile strength steel wires wrapped around the liner; the third layer 46 comprises a cross wrap of steel wires; and the fourth or outermost layer 48 comprises a polytetraflouroethylene jacket. The second conduit 40, as best shown in FIG. 3, incldues an opening or split for access to the core element 30. The second conduit 40 is actually divided into two halves which are connected by a coupling comprising the fittings 50, the threaded tubes 52, the threaded connector 54 for connecting the tubes 52, and the threaded nuts 56 which urge the outward ends of the tubes 52 against flanges 58 presented by the fittings 50. The tubes 52 telescope over the flanges 58 during assembly. A U-shaped bushing 60 is disposed in the coupling and surrounds the core element except for a longitudinal slot which is used to place the bushing 60 about the core element and which is filled by a rod 62 disposed in the slot.

As is typical in such assemblies, a connector means interconnects the first and second ends 32 and 34 of the core element for maintaining the core element entrained about the core wheels 16 and 20 regardless of the orientation of the core element as the core element passes through the housings 12 and 14. This connector means is characterized by a first loop 64 attached to the first end 32 of the core element and a second loop 66 attached to the second end 34 of the core element and a single unitary link 68 extending through the loops 64 and 66. The connector means also includes a first socket 70 attached to the first end 32 and a second socket 72 attached to the second end 34. The first loop 64 has a generally U-shape with legs presenting distal ends 74 secured to the first socket 70 and the second loop 66 has a generally U-shape with legs presenting distal ends 76 secured to the second socket 72. The loops 64 and 66 are formed or bent in the U-shape from bar stock having a circular cross section. Each of the sockets 70 and 72 has a socket end receiving the respective end of the core element and a loop end and are cylindrical between the socket and loop ends thereof. Each of the sockets 70 and 72 includes diametrically opposite flats 78 on the loop end and the distal ends 74 and 76 of the loops are disposed on the flats 78. Preferably, the distal ends 74 and 76 of the loops 64 and 66 are welded to the flats 78 of the sockets 70 and 72.

The link 68 comprises an oval plate having a thickness between opposite sides and a hole 80 in each end between the sides with one of the loops extending through one of the holes and the other loop extending through the other hole. The holes 80 and the periphery of the link 68 are rounded. The width of the link 68 equals the distance between the outside extremities of the legs of each U-shape of the loops 64 and 66 and the distance between the centers of the holes 80 in the link 68 is twice the diameter of the cylindrical sockets 70 and 72. In addition, the diameter of the holes 80 is within twenty percent (20%) of the thickness of the link 68.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly (10) comprising:

a drive wheel housing (12);

a drive wheel (20) having a plurality of gear teeth (18) and rotatably supported by said drive wheel housing (12);

a driven wheel housing (14) spaced from said drive wheel housing (12);

a driven wheel (16) having a plurality of gear teeth (18) and rotatably supported by said driven wheel housing (14);

a motion transmitting core element (30) comprising a flexible cable (31) having first (32) and second (34) ends and a wire (36) wrapped helically about said cable (31) in spaced convolutions and entrained about said wheels (16 and 20) and in meshing engagement with said gear teeth (18) for transmitting rotational movement between said wheels (16 and 20);

connector means interconnecting said first (32) and second (34) ends of said core element (30) for maintaining said core element (30) entrained about said wheels (16 and 20) regardless of the orientation of said core element (30) as said core element (30) passes through said housings (12 and 14);

said connector means including a first loop (64) attached to said first end (32) of said core element (30) and a second loop (66) attached to said second end (34) of said core element (30) and a single unitary link (68) extending through said loops (64 and 66); and;

said connector means including a first socket (70) attached to said first end (32) and a second socket (72) attached to said second end (34), said first loop (64) having a U-shape with legs presenting distal ends (74) secured to said first socket (70), and said second loop (66) having a U-shape with legs presenting distal ends (76) secured to said second socket (72).

2. An assembly as set forth in claim 1 wherein said link (68) comprises an oval plate having a thickness between opposite sides and a hole (80) in each end between said sides with one of said loops (64 and 66) extending through one of said holes (80) and the other loop extending through the other hole (80).

3. An assembly as set forth in claim 2 wherein each of said loops (64 and 66) comprises bar stock having a circular cross section and formed in said U-shape.

4. An assembly as set forth in claim 2 wherein said holes (80) and the periphery of said link (68) are rounded.

5. An assembly as set forth in claim 2 wherein said distal ends of said loops (64 and 66) are welded to said sockets (70 and 72).

6. An assembly as set forth in claim 2 wherein each of said sockets (70 and 72) has a socket end receiving the respective end of said core element (30) and a loop end, each of said sockets (70 and 72) being cylindrical between the socket and loop ends thereof, each of said sockets (70 and 72) including diametrically opposite flats (78) on said loop end, said distal ends (74 and 76) of said loops (64 and 66) being disposed on said flats (78).

7. An assembly as set forth in claim 6 wherein said distal ends (74 and 76) of said loops (64 and 66) are welded to said flats (78) of said sockets.

8. An assembly as set forth in claim 3 wherein the width of said link (68) equals the distance between the outside extremities of said legs of each U-shape.

9. An assembly as set forth in claim 3 wherein the distance between the centers of said holes (80) in said link (68) is twice the diameter of said cylindrical sockets (70 and 72).

10. An assembly as set forth in claim 3 wherein the diameter of said holes (80) is within twenty percent of the thickness of said link (68).

* * * * *